(12) United States Patent
Oelsch

(10) Patent No.: US 6,800,976 B2
(45) Date of Patent: Oct. 5, 2004

(54) SPINDLE MOTOR WITH MAGNETIC SEAL

(75) Inventor: Jurgen Oelsch, Hohenroth (DE)

(73) Assignee: Precision Motors Deirtsche Minebea GmbH, Villingen-Schwenningen (DE)

( * ) Notice: Subject to any disclaimer, the term of this patent is extended or adjusted under 35 U.S.C. 154(b) by 0 days.

(21) Appl. No.: 10/207,749

(22) Filed: Jul. 29, 2002

(65) Prior Publication Data
US 2002/0178572 A1 Dec. 5, 2002

Related U.S. Application Data

(62) Division of application No. 09/420,109, filed on Oct. 18, 1999, now Pat. No. 6,429,560.

(30) Foreign Application Priority Data
Oct. 24, 1998 (DE) .......................... 198 49 094

(51) Int. Cl.[7] ................................ H02K 5/16
(52) U.S. Cl. ...................... 310/90; 277/410; 277/629; 384/94
(58) Field of Search ................... 310/67 R, 90, 310/90.5; 29/596; 277/410, 920, 922, 935, 629; 384/94, 129, 130, 132, 133, 477, 478, 488

(56) References Cited

U.S. PATENT DOCUMENTS

| | | | | |
|---|---|---|---|---|
| 5,009,436 A | * | 4/1991 | Endo et al. | 277/347 |
| 5,152,539 A | * | 10/1992 | Takii et al. | 277/347 |
| 5,238,254 A | * | 8/1993 | Takii et al. | 277/347 |
| 5,267,737 A | * | 12/1993 | Cossette et al. | 277/410 |
| 5,325,004 A | * | 6/1994 | Mori et al. | 310/67 R |
| 5,396,134 A | * | 3/1995 | Mochizuki | 310/67 R |
| 5,536,986 A | * | 7/1996 | Fukuyama et al. | 310/67 R |
| 5,572,078 A | * | 11/1996 | Saichi et al. | 310/90 |
| 5,821,646 A | * | 10/1998 | Chuta et al. | 310/67 R |
| 6,429,560 B1 | * | 8/2002 | Oelsch | 310/90 |

* cited by examiner

Primary Examiner—Dang Le
(74) Attorney, Agent, or Firm—Myron Greenspan, Esq.; Lackenbach Siegel LLC

(57) ABSTRACT

The present invention relates to a spindle motor with a magnetic seal. A method and an apparatus are described for sealing spindle motors, preferably those used for disk storage units.

24 Claims, 7 Drawing Sheets

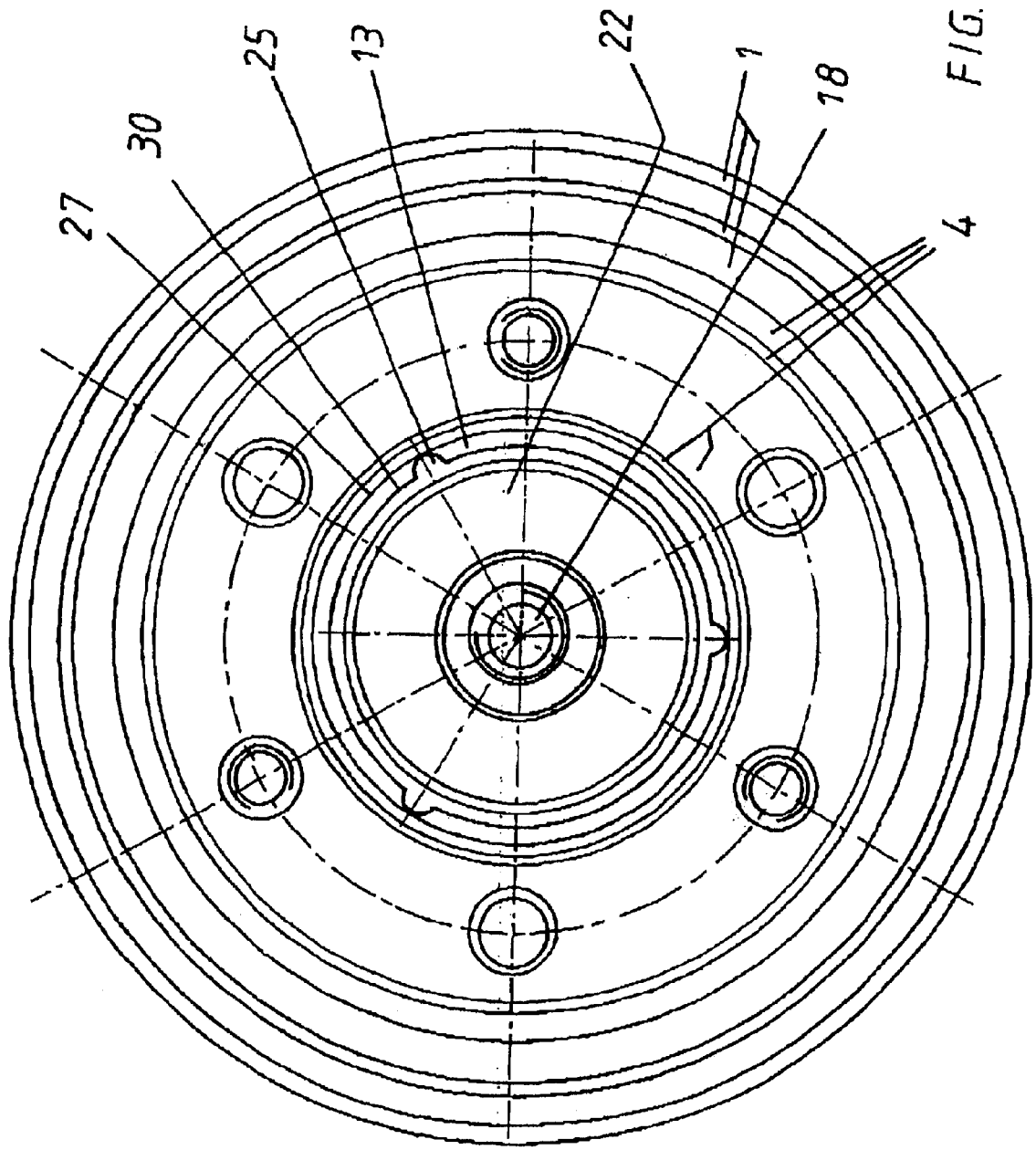

SPINDLE MOTOR WITH MAGNETIC SEAL

This application is a division of U.S. Pat. No. 09/420,109 filed Oct. 18, 1999 now U.S. Pat. No. 6,429,560.

The invention relates to a spindle motor with magnetic seal according to the introductory parts of Claims 1 and 5.

Small-sized spindle motors of this type are used especially as motors for disk storage units. These are usually collectorless DC motors, which have the problem that the bearings need to be extremely well sealed so that no oil from the bearings can penetrate into the clean air space around the motor, where the disks are located.

It is known to provide suitable sealing arrangements at the end openings between the armature and the fixed stator. In one such known arrangement, the seal may take the form of a magnetic seal essentially comprising two metal disks positioned a certain distance apart, between which a permanently magnetic disk is trapped.

A gap is thus formed on the radially inner side (i.e. towards the fixed shaft). This gap is filled with a ferromagnetic fluid, which is kept in place by the permanent magnet trapped between the two metal disks. Such a magnetic seal arrangement is known, for sealing either the upper end of the motor or the lower end of the motor, and in many cases both.

It is likewise known to use a cap, usually made of metallic material, as the outermost element of this magnetic seal. The function of this cap is to seal and protect the magnetic seal from the exterior. A known way of bringing this about is to bond such a cap into the open recess in the hub of the armature to seal it in place. This ensures that the cap, the ultimate and outermost element of the magnetic seal, will prevent foreign bodies from the exterior from getting into the magnetic seal.

Hitherto, it has moreover been known to form this cap as a disk-shaped body with a uniformly profiled rim all round. This, however, has the drawback that it is necessary to bond both the magnetic seal and, in a separate operation, the cap, thus increasing the labour cost. Moreover it takes up an excessive amount of space, as two seal arrangements (two beads of adhesive) have to be put in place, one axially superimposed above the other. This increases the overall height of the motor.

Therefore the fundamental problem which the invention seeks to solve is to develop a way of sealing the magnetic seal for a spindle motor of the kind stated in the introduction which both reduces the height required for its installation and simplifies the sealing operation so that the labour cost is reduced.

For the solution of the stated problem, the invention is characterized by the technical teaching of Claims 1 and 5.

The essential feature of the invention is that both the cap and the magnetic seal are bonded to the open seat in the hub with a single bead of adhesive.

This makes it possible for the first time to greatly reduce the overall height of a spindle motor of this type by virtue of the fact that only one adhesive bead is required in the axial assembly, and not two beads needing to be placed one above the other and spaced apart.

It is achieved by shaping the cap so that it is capable of being bonded by the adhesive bead to the inner open seat in the hub and yet forms openings through which adhesive is able to flow past the outer edge of the cap to the magnetic seal beneath. Thus the radially outer rim of the cap and the radially outer rim of the underlying magnetic seal are bonded in place with a single bead of adhesive.

This is achieved by forming suitable gaps or openings at the cap's outer edge, instead of forming it as an unbroken rim.

In a first embodiment, such gaps or openings are formed by making the rim of the cap smaller than the diameter of the inner seat, so that a gap is formed between this smaller rim and the internal diameter of the seat in the hub, and the adhesive bead is able to flow through the said gap, past the cap, to the magnetic seal beneath, and bond the rim of the upper disk-of the magnetic seal to its seat in the hub.

Furthermore this is achieved by providing lobes which project radially outwards beyond the said rim and whose outer periphery corresponds to the internal diameter of the seat in the hub.

Preferably, a plurality of radial lobes are uniformly distributed around the circumference of the cap and are integrally joined thereto. The lobes then centre the cap in the central seat in the hub.

A uniform bonding gap is then obtained, as all the gaps between the inner rim of the cap and the inner circumferential face of the seat are uniformly centred, so that an even distribution of adhesive is assured.

In a preferred configuration of the present invention, instead of radially outwards pointing lobes uniformly distributed around its circumference, the cap is provided with a uniform, basically closed, peripheral rim, and, in the region of that rim, recesses, openings or slots are provided through which the adhesive is likewise able to flow to the magnetic disk beneath, to bond the edge thereof to the seat's inner wall.

Because the adhesive essentially runs into the gaps between the cap's outer rim and the surface of the magnetic disk beneath, the application of adhesive in the end region of this spindle motor is very thin, and this.greatly reduces the overall height of the motor. The fact that adhesive is also deposited on the lobes, making a joint with the adjoining wall of the seat in the hub, is insignificant, because the adhesive which is deposited on the lobes essentially runs off the lobes to left and right and into the gaps formed between the cap and the magnetic disk beneath.

The subject-matter of the present invention is disclosed not only by the subject-matter of the individual claims, but also by the individual claims taken in combination All details and features disclosed in the documents (including the Abstract), and in particular the physical embodiment illustrated in the drawings, are claimed as essential to the invention, in so far as, taken separately or in combination, they are novel with respect to the state of the art.

The invention will now be described in detail with reference to drawings illustrating several ways in which the invention may be carried out. Further features essential to the invention and advantages of the invention will become apparent from the drawings and from the description thereof.

In the drawings:

FIG. 1 is a schematic section through a spindle motor according to the invention FIG. 2 is a larger-scale section view of the upper region of the spindle motor FIG. 3 is a schematic section through a -spindle motor according to the invention with an upper seal unit FIG. 4 is a schematic section through a spindle motor according to the invention with a lower seal unit FIG. 5 is a schematic section through a spindle motor according to the invention with both upper and lower seal units FIG. 6 is a top view of the cap, the spindle motor being viewed in the direction of Arrow III in FIG. 1

FIG. 7 is a top view of the spindle motor with cap.

FIG. 1 is a general view of a spindle motor with a fixed baseplate 1 which accommodates a stator iron core 2 with its winding 3. The said parts 1–3, in conjunction with a fixed shaft 5 about which the hub 4 of an armature rotates, form the stator. A lower bearing 6 and an upper bearing 7 serve as rotational bearings. These bearings 6, 7 are sealed off from the outer atmosphere by [lower and upper] end shields 9, 10 respectively, to prevent oil particles from escaping into the atmosphere.

The significant point is that a seal unit 11 equipped with a magnetic seal is arranged in the upper region of this spindle motor.

However, the invention is not limited to the provision of an upper seal unit 11. This seal unit 11 can also be provided in the lower region of the spindle motor, i.e. below the lower bearing 6. Or two magnetic seal arrangements may be provided, namely an upper seal unit 11 and a lower seal unit, as shown in FIG. 5.

Another possibility, shown in FIG. 4, is a third embodiment in which only a lower seal unit is provided, and the upper seal unit is omitted.

The upper seal unit 11 essentially consists of a magnetic seal 12. This comprises two metal disks 13 which are spaced apart, forming between them a gap which is occupied by a permanent magnet disk 14. In the radially inwards direction the two metal disks 13 form a magnetic slot in conjunction with the permanent magnet disk 14, and the region of this slot 15 is filled with a ferromagnetic fluid 16 which is kept in this slot 15 by the action of magnetism. This fluid is drawn onto the outer circumferential face of a seal sleeve 17 (made of magnetically conductive steel), so forming a seal. The seal sleeve is press-fitted on a central screwed seat 18 which, in turn, forms part of the fixed shaft 5.

The inner ring 19 of the upper bearing 7 is press-fitted or bonded at its inner circumferential face onto the outer circumferential face of a knurled sleeve 20 fixed to the shaft 5. Above the upper bearing 7 is the end shield 10 previously mentioned, which establishes a gap (accommodation space 21) with respect to the lower metal disk 13 of the magnetic seal 12. This space (accommodation space 21) serves to accommodate ferromagnetic fluid 16 escaping from the meniscus of fluid 16 formed on the outer circumferential face of the sleeve 17.

The same applies to the upper accommodation space 23 formed between the upper metal disk 13 and the cap 22 according to the invention.

The significant point is that the cap 22 has been bonded into the inner seat, i.e. to the wall 27 of the hub 4, with a single bead 26 of adhesive, and the magnetic seal 12 has been bonded in place simultaneously by this same adhesive bead 26.

First, as FIG. 3* shows, the cap 22 essentially consists of a body in the shape of a flat disk but with a joggle 24 in its outer region. The purpose of this joggle is to establish the accommodation space 23 for the overspill of ferromagnetic fluid 16.

*It seems likely that FIGS. 3, 4 and 5 were later additions, and that FIG. 6 is meant.

The significant point is that the cap 22 has radially outwards directed lobes 25 uniformly distributed around its periphery. The outer diameter of these lobes (edge 30**) is chosen to fit snugly into the inner diameter 32 of the seat in the hub 4. That is to say, the edges 30 of the lobes 25 are flush with the inner wall 27 of the seat.

**in FIG. 6. (FIG. 7 is wrong.) (Translator's notes)

Set back from the lobes 25 there is a rim 28 with a smaller diameter.

Figure 1:
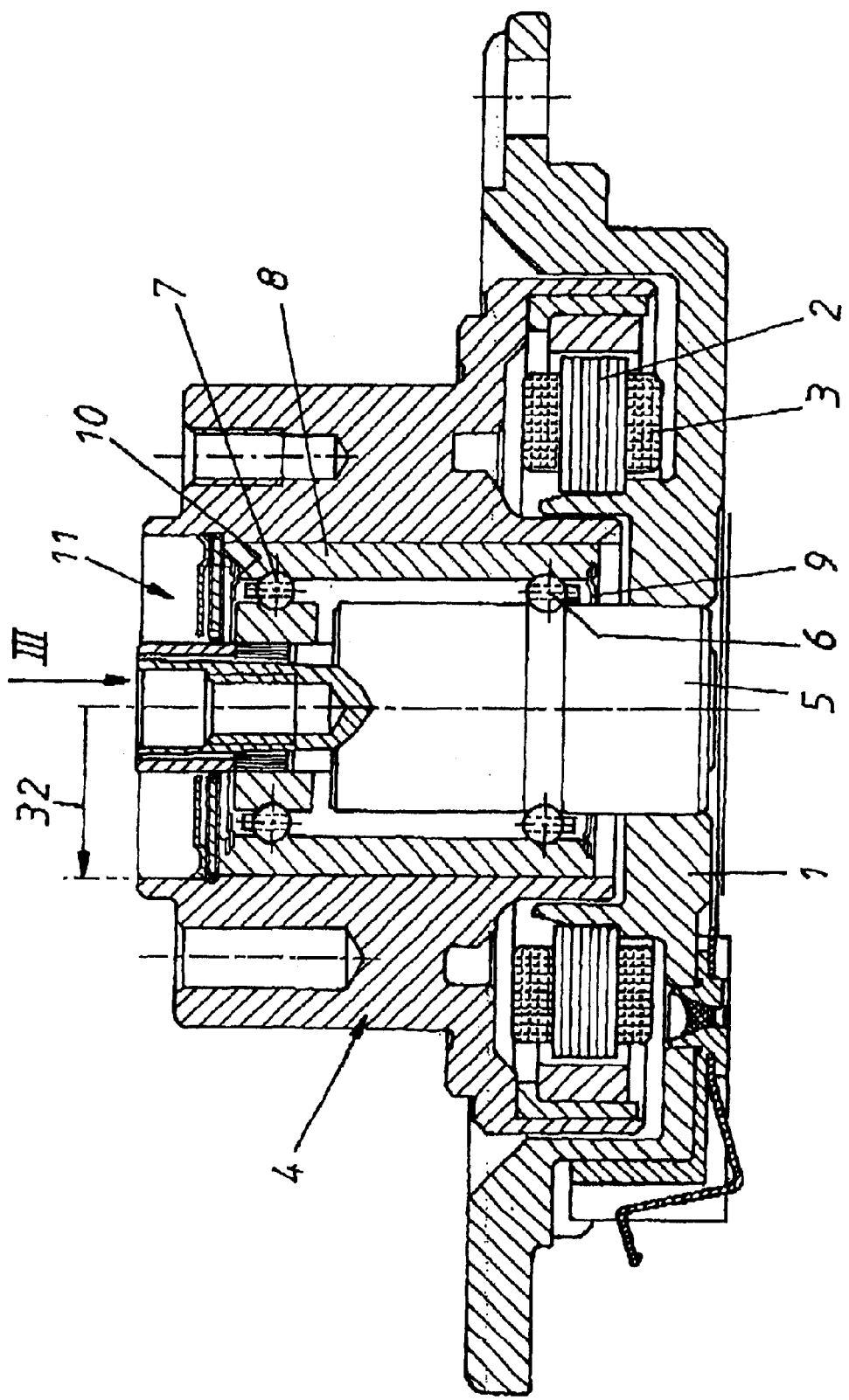
Figure 2:
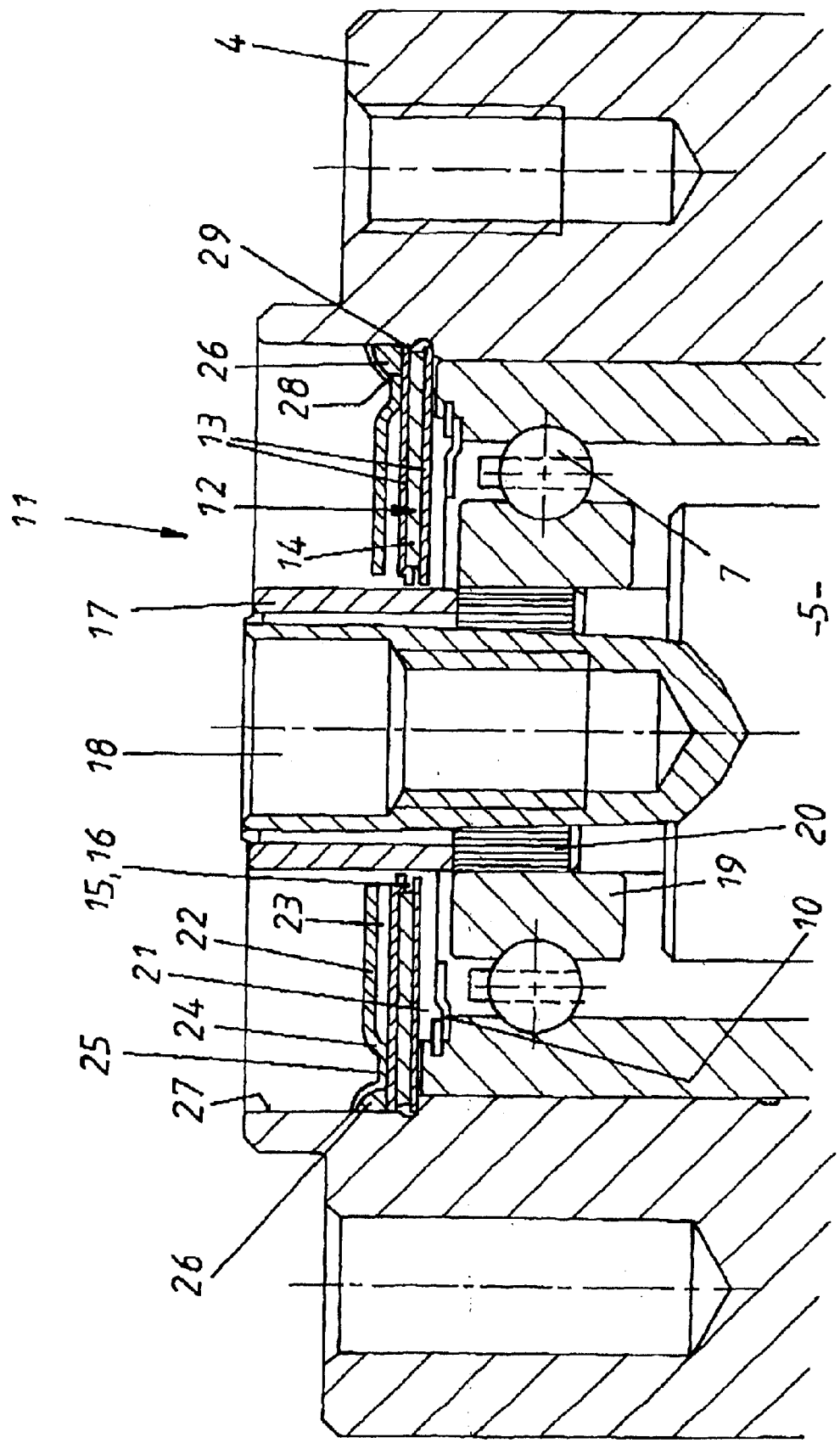
Figure 6:
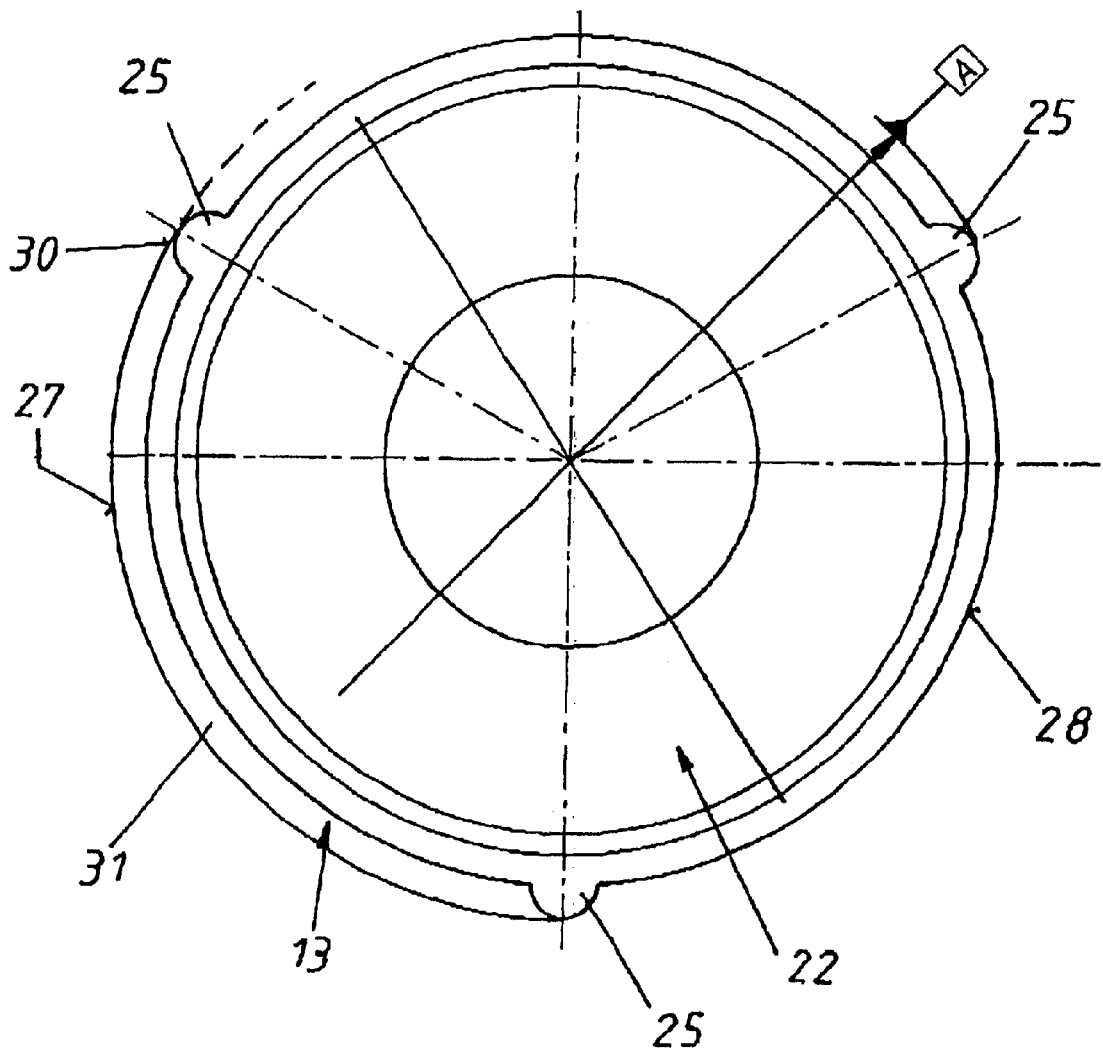

FIG. 6 shows, in a top view of the end seal arrangement, that a gap 31 is thereby formed between the inner rim 28 of the cap 22 and the outer edge 30 of the projecting lobes 25. Into this gap, which is open at the top, and also onto the lobes 25, a continuous bead 26 of adhesive is placed, some of which lands on the lobes 25, but which also runs into the gap 31 and, as FIG. 2 shows (on the right-hand side of the drawing), is deposited on the surface of the upper metal disk 13 of the magnetic seal 12. In this way, the rim of the magnetic seal 12 is bonded to the inner wall 27 of the seat, and the cap is bonded to the same inner wall 27 with the same bead of adhesive through the bonding of the lobes 25.

Thus the adhesive bead is laid on the surface 29 of the upper metal disk 13 of the magnetic seal 12, forming a bonded joint to the inner wall 27.

Figure 3:
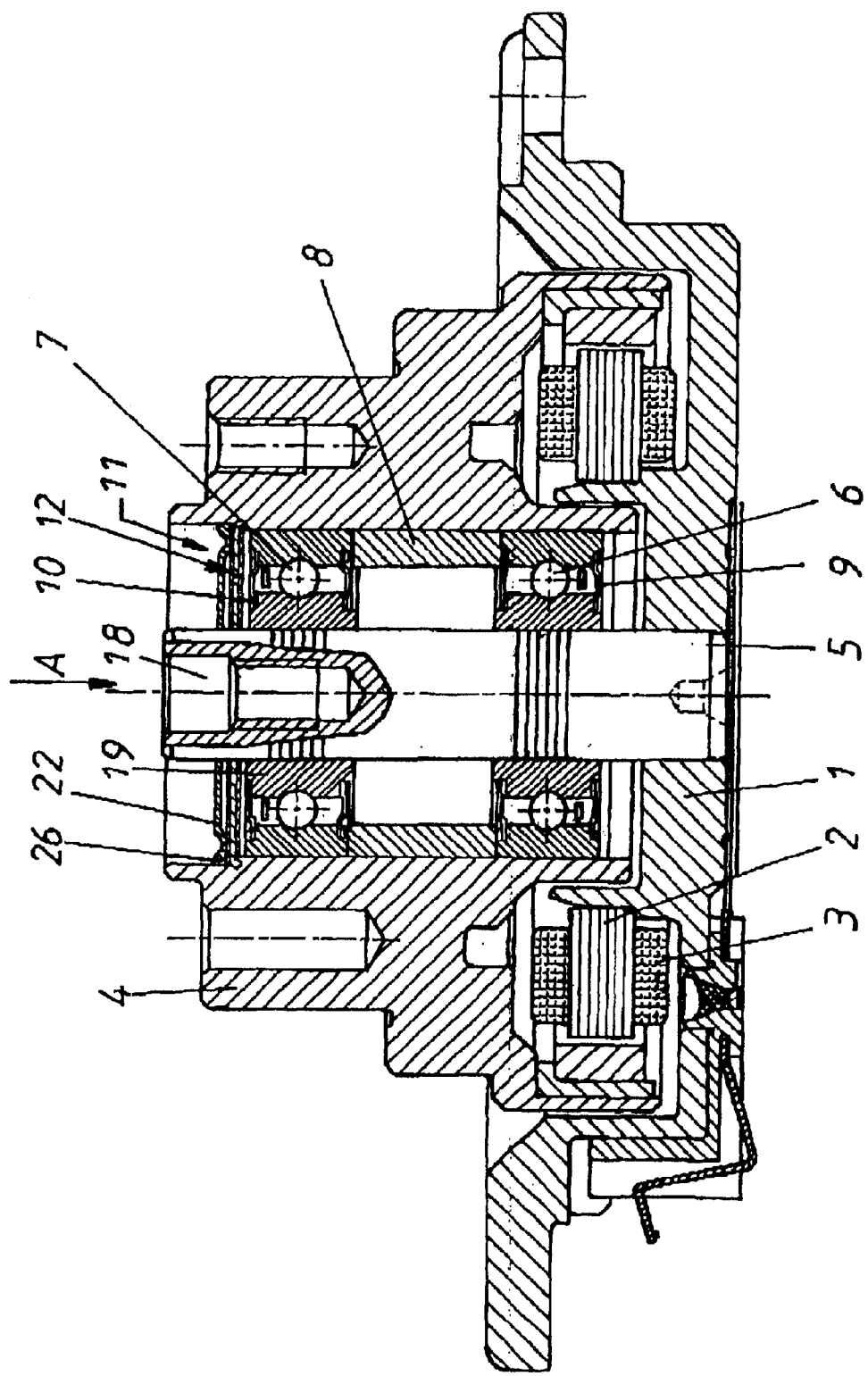
FIG. 3 shows a schematic section through a spindle motor according to the invention with an upper seal unit. The form of the armature is slightly modified in relation to that shown in FIG. 1.
Figure 4:
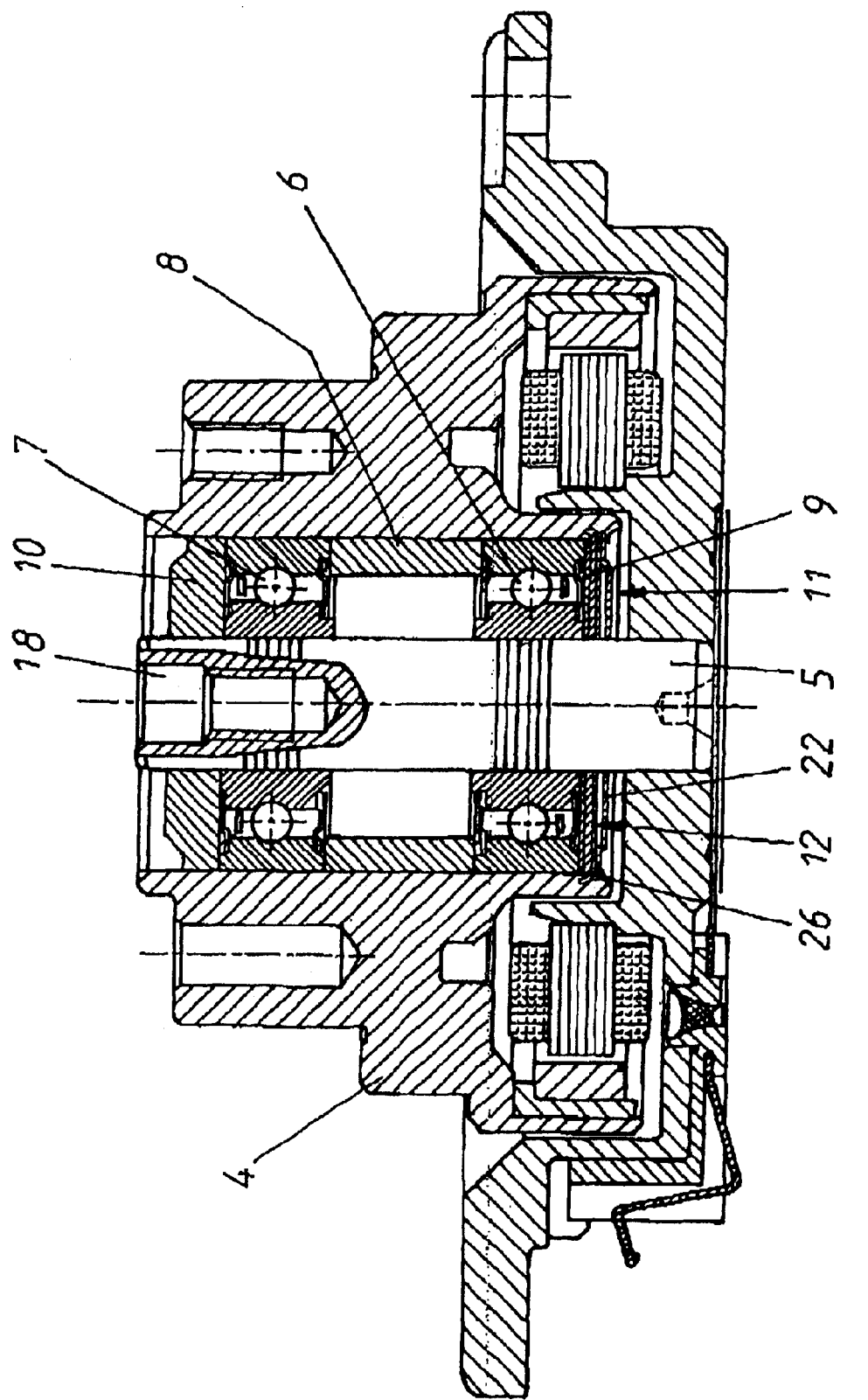
FIG. 4 shows a schematic section through a spindle motor according to the invention with a lower seal unit. The form of the armature is slightly modified in relation to that shown in FIG. 1.
Figure 5:
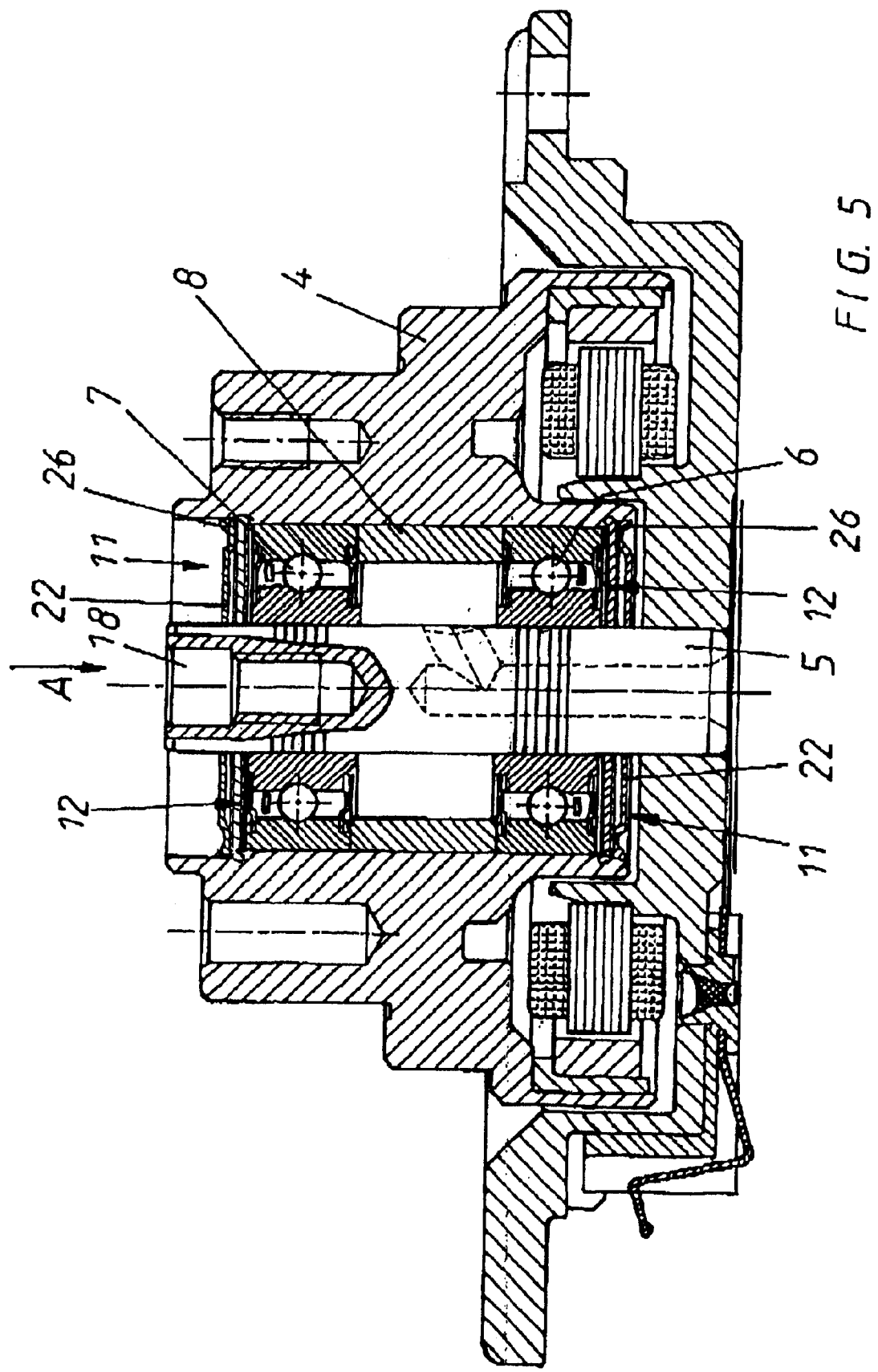
FIG. 5 shows a schematic section through a spindle motor according to the invention with upper and lower seal units. The form of the armature is slightly modified in relation to that shown in FIG. 1.

The right-hand side of FIG. 2 shows that the rim 28 ends at a short distance from the wall 27, that is to say, the gap 31 previously mentioned in [the context of] FIG. 3 is formed, into which the adhesive bead 26 is able to flow down from above.

Of course, bonding of the cap to the wall 27 by the bead 26 does not only take place at the lobes. Because the adhesive bead also overlaps the rim 28, the cap is bonded all round its periphery to the wall 27, and at the same time the magnetic seal 12 is also bonded to this wall 27.

As well as the fixing effect of the bonding, an excellent sealing effect is simultaneously obtained, as the adhesive bead runs completely round. In other words, the bead is closed all round, so that this outer rim is bonded and sealed over its entire periphery.

DRAWING LEGEND

1. Baseplate
2. Stator iron core
3. Winding
4. Hub (armature)
5. Shaft
6. Lower bearing
7. Upper bearing
8. Outer ring
9. End shield, lower
10. End shield, upper
11. Seal unit
12. Magnetic seal
13. Metal disk
14. Permanent magnet disk
15. Slot
16. Ferromagnetic fluid?
17. Seal sleeve
18. Screwed seat
19. Inner ring of bearing
20. Knurled sleeve
21. Accommodation space
22. Cap
23. Accommodation space
24. Joggle
25. Lobe
26. Adhesive bead
27. Wall (hub)

28. Rim
29. Surface
30. Edge (lobe)
31. Gap
32. Inner diameter (hub)

What is claimed is:

1. A spindle motor comprising:
   a magnetic seal between an inner wall of an axial end of a hub of a stator and a fixed shaft, the magnetic seal comprising a pair of spaced apart metal disks and a magnetic disk arranged between them, and ferromagnetic fluid arranged to provide a seal towards the fixed shaft, the magnetic seal having a radially outer rim substantially conforming to the shape of the inner wall and having a predetermined diameter;
   having a radially outer rim substantially conforming to the shape of the inner wall, and having a predetermined diameter that is substantially uniformly smaller compared to the predetermined diameter of the magnetic seal, wherein a gap is formed between the inner wall and the radially outer rim of the cap; and
   a single bead of adhesive in the region of the gap that contacts each of the outer periphery of the magnetic seal, the outer periphery of the cap, and the inner wall, whereby the magnetic seal and the cap (22) are bonded into the inner wall of the hub without having to be spaced apart from each other.

2. Spindle motor according to claim 1, characterized in that a seal unit (11) is arranged in the upper region of the spindle motor.

3. Spindle motor according to claim 1, characterized in that a seal unit (11) is arranged in the lower region of the spindle motor.

4. Spindle motor according to claim 1, characterized in that seal units (11) are arranged in both upper and lower regions of the spindle motor.

5. Spindle motor according to claim 1, characterized in that the radially outer rim (28) of the cap (22) is formed so that it has openings leading to the magnetic seal beneath.

6. Spindle motor according to claim 5, characterized in that a seal unit (11) is arranged in the upper region of the spindle motor.

7. Spindle motor according to claim 5, characterized in that a seal unit (11) is arranged in the lower region of the spindle motor.

8. Spindle motor according to claim 5, characterized in that seal units (11) are arranged in both upper and lower regions of the spindle motor.

9. Spindle motor according to claim 1, characterized in that the radially outer rim (28) of the cap (22) is formed so that it has radially outwards pointing lobes.

10. Spindle motor according to claim 9, characterized in that a seal unit (11)is arranged in the upper region of the spindle motor.

11. Spindle motor according to claim 9, characterized in that a seal unit (11) is arranged in the lower region of the spindle motor.

12. Spindle motor according to claim 9, characterized in that seal units (11) are arranged in both upper and lower regions of the spindle motor.

13. Spindle motor according to claim 1, characterized in that the radially outer rim (28) of the cap (22) is basically closed, but approximately radially encircling recesses, openings or slots are disposed in the region of that rim.

14. Spindle motor according to claim 13, characterized in that a seal unit (11) is arranged in the upper region of the spindle motor.

15. Spindle motor according to claim 13, characterized in that a seal unit (11) is arranged in the lower region of the spindle motor.

16. Spindle motor according to claim 13, characterized in that seal units (11) are arranged in both upper and lower regions of the spindle motor.

17. Spindle motor according to claim 1, characterized in that in the radially inwards direction the two metal disks (13) form a magnetic slot in conjunction with the permanent magnet disk (14), and a ferromagnetic fluid 16 is contained in the region of this slot (15) and is kept there by the action of magnetism.

18. Spindle motor according to claim 1, characterized in that the ferromagnetic fluid is drawn onto the outer circumferential face of a seal sleeve (17) which is made of magnetically conductive steel, so forming a seal.

19. Spindle motor according to claim 1, characterized in that the seal sleeve is press-fitted on a central screwed seat (18) which, in turn, forms part of the fixed shaft (5).

20. Spindle motor according to claim 1, characterized in that an accommodation space (21, 23) serves to accommodate ferromagnetic fluid (16) escaping from the meniscus of fluid (16) formed on the outer circumferential face of the sleeve (17).

21. Spindle motor according to claim 1, characterized in that the cap (22) essentially consists of a flat disk-shaped body which has a joggle (24) in its outer region, to form the accommodation space (23).

22. Spindle motor according to claim 1, characterized in that a seal unit (11) is arranged in the upper region of the spindle motor.

23. Spindle motor according to claim 1, characterized in that a seal unit (11) is arranged in the lower region of the spindle motor.

24. Spindle motor according to claim 1, characterized in that seal units (11) are arranged in both upper and lower regions of the spindle motor.

* * * * *